Nov. 13, 1956 W. OCHSE 2,770,173
MECHANISMS FOR CONTROLLING THE ANGULARITY
OF MILLING MACHINE CUTTERS
Filed April 26, 1954 3 Sheets-Sheet 1
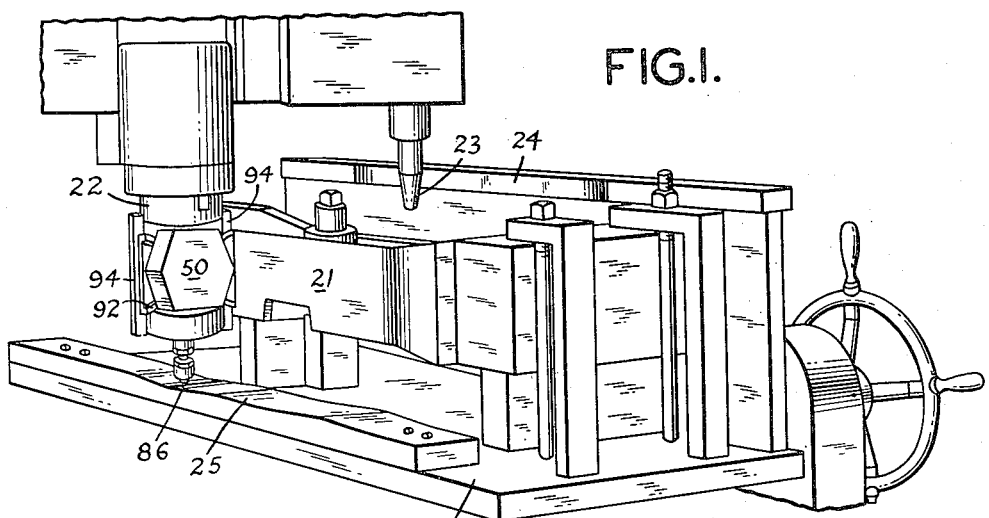
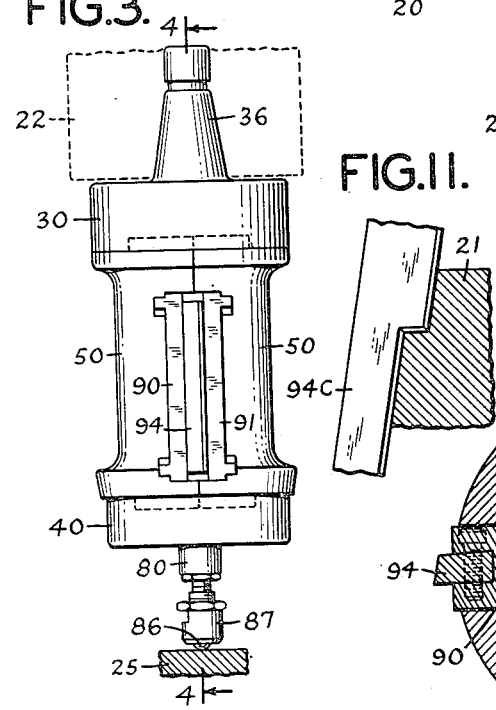
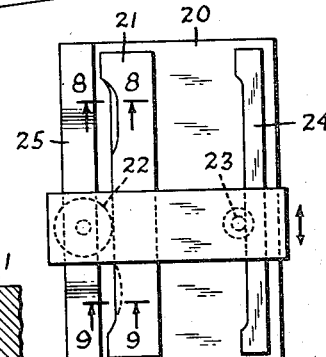
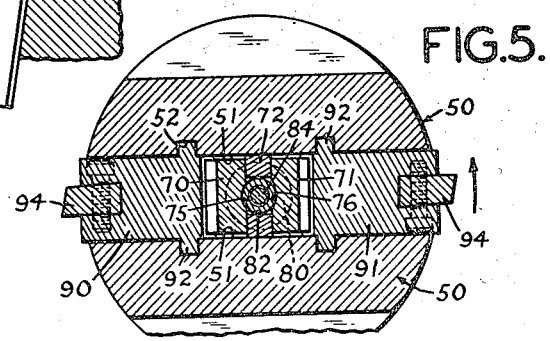
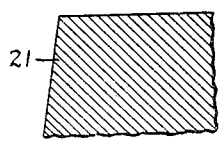
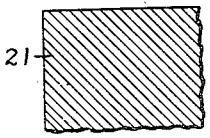
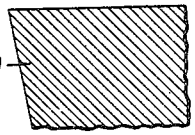
INVENTOR
WILLIAM OCHSE
BY E. W. Marshall
ATTORNEY Nov. 13, 1956 W. OCHSE 2,770,173
MECHANISMS FOR CONTROLLING THE ANGULARITY
OF MILLING MACHINE CUTTERS
Filed April 26, 1954 3 Sheets-Sheet 2

INVENTOR
WILLIAM OCHSE
BY E. W. Marshall
ATTORNEY

Nov. 13, 1956 W. OCHSE 2,770,173
MECHANISMS FOR CONTROLLING THE ANGULARITY
OF MILLING MACHINE CUTTERS
Filed April 26, 1954 3 Sheets-Sheet 3
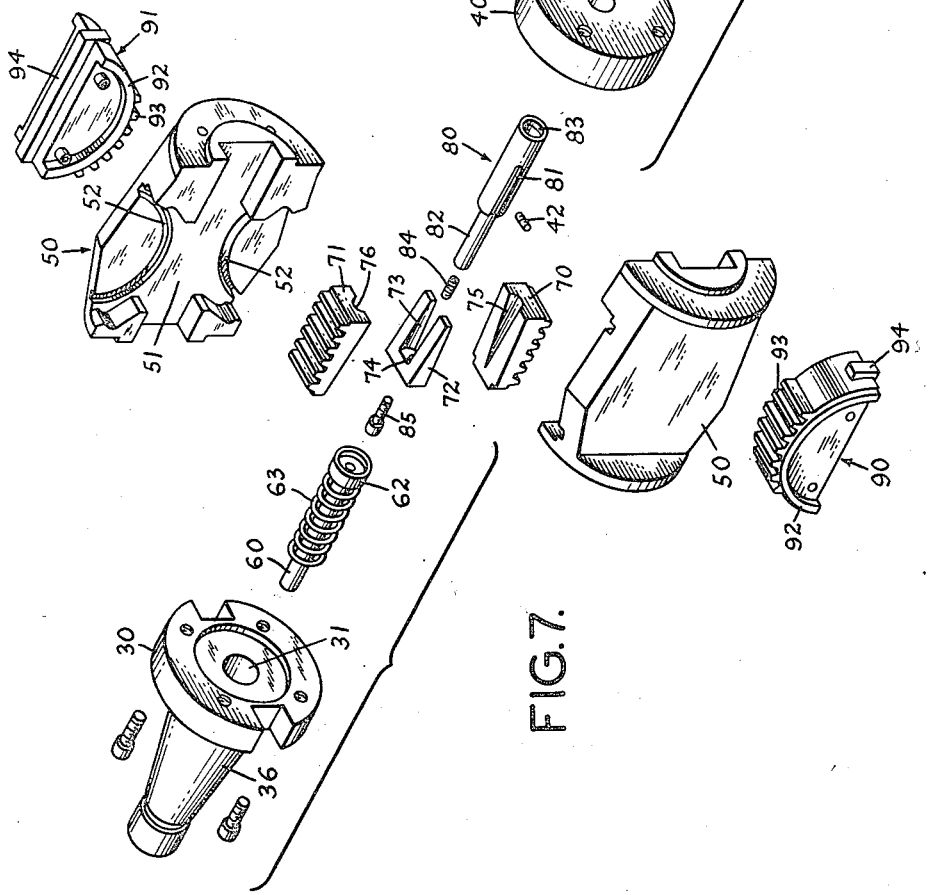
INVENTOR
WILLIAM OCHSE
BY
E. W. Marshall
ATTORNEY

United States Patent Office 2,770,173
Patented Nov. 13, 1956

2,770,173

MECHANISMS FOR CONTROLLING THE ANGULARITY OF MILLING MACHINE CUTTERS

William Ochse, Uniondale, N. Y., assignor to Liberty Products Corporation, Farmingdale, N. Y., a corporation of New York Application April 26, 1954, Serial No. 425,354

3 Claims. (Cl. 90—13)

This invention relates to improvements in mechanisms for controlling the angularity of milling machine cutters and its object is to provide a simple device of few parts which may be applied to standard contour-cutting milling machines which will control automatically to a great nicety the angularity in a transverse plane normal to the bed of such machine of its cutter or cutters.

This and other objects of the invention will appear in the following specification in which I will describe an embodiment of the invention and point out is novel features in claims.

Referring to the drawings:

Fig. 1 is a perspective view of a part of a standard contour-cutting milling machine with a device which embodies my invention applied thereto and with a piece of material being machined clamped to its table.

Fig. 2 is a plan view on a reduced scale of some of the parts shown in Fig. 1.

Fig. 3 is a part in elevation on a larger scale of the form of my angular control device shown and described in this specification.

Fig. 5 is a sectional plan view of the device on a section taken on the line 5—5 of Fig. 4.

Fig. 6 is a sectional side elevation of some of the parts shown in Fig. 4. This section is taken on the line 6—6 of the latter figure.

Fig. 7 is an exploded perspective view showing the parts separately of the device illustrated in Figs. 3–6.

Fig. 8 is a sectional end view of a piece of material which has been machined by my device with straight edged cutters held in one angular position.

Fig. 9 is a similar view which has been machined with the cutters held in the opposite angular position and Fig. 10 shows similarly a piece which has been machined with the cutters held in a vertical position.

Fig. 11 is an end view of a cutter of modified form and a piece of material shown in section which has been machined thereby.

Like parts in the drawings are denoted by the same reference numerals.

Figure 4:
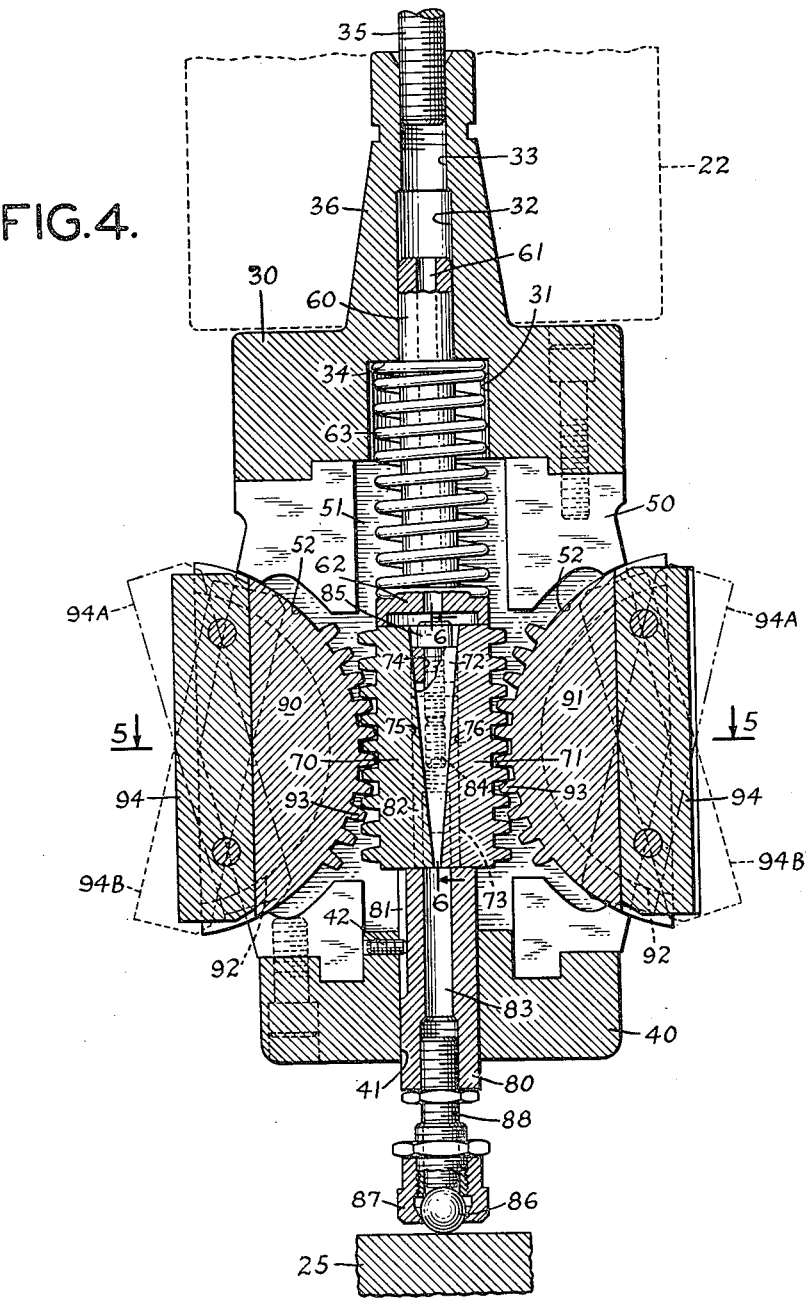
Fig. 4 is a sectional side elevation on a still larger scale of the device shown in Fig. 3, the section being taken on the line 4—4 of the latter figure.

20 designates the longitudinally moveable table of a milling machine of standard construction. 21 is a piece of material clamped to this table.

22 is a transversely movable tool supporting head, the lateral position of which in relation to material 21 is determined by the engagement of a roller 23 with a cam 24.

The relatively moveable parts of my device are supported in a structure which comprises a circumferentially continuous upper portion 30, a circumferentially continuous lower portion 40 and two similar but oppositely disposed intermediate portions 50, 50. These portions bolted together form a rigid body.

In the upper portion 30 are three axial bores 31, 32 and 33 of different diameters. A shoulder 34 formed between the bores 31 and 32 forms an abutment for a purpose which will be pointed out hereinafter. The upper smallest bore is internally threaded for the reception of a bolt 35. The upper end 36 of this upper portion is tapered to fit an opening of similar shape in the head 22 into which it is drawn by the bolt 35. Thus, the supporting head is held rigidly in a vertical position in the milling machine.

60 is an upper spindle slidably supported in the bore 32. Through it is an axial bore 61. Its lower end 62 is enlarged to form an abutment for a compression spring 63, the upper end of which abuts the shoulder 34.

70 and 71 are oppositely faced toothed racks. The sides of these racks are slidably supported on flat surfaces 51 on the intermediate body members 50. The inner surfaces of these racks are beveled and abut a wedge 72 through the greater part of which is a central bore 73. 74 is a smaller bore through the larger end of the wedge.

The lower enlarged end 62 of the upper spindle abuts the upper ends of the racks 70, 71. The lower ends of these racks abut a push rod 80, a part of which is slidably supported in a central bore 41 in the lower body member 40. 42 is a set screw in the lower body member which projects into a slot 81 in the push rod and limits the rotating movement thereof.

82 designates a part of the push rod of smaller diameter which extends upwardly between the racks 70, 71 which are grooved as shown at 75, 76 to receive it, and into the wedge 72. An axial bore 83 extends through the push rod. Its upper end is internally threaded to receive an adjusting plug 84 and an adjusting screw 85. The latter passes with clearance through the bore 74 in the larger end of the wedge.

By this arrangement, the lateral space between the racks 70, 71 may be adjusted to make them engage without backlash with gear segments which will be described presently and to compensate for wear.

A hardened steel ball 86 is held on the end of the push rod as shown in Figs. 3 and 4 by a housing 87 on a threaded member 88 screwed into an internally threaded enlargement of the lower end of the push rod bore 83.

The parts thus described spring press the ball against a longitudinally disposed accurately ground cam 25 on the table of the milling machine and impart a vertical movement to the racks 70, 71.

90, 91 are cutter holders. Each of them has outwardly and oppositely extending arcuate flanges 92. These fit in arcuate grooves 52 in the intermediate body members 50. They each have gear segments 93 which mesh with the racks 70, 71. Cutters 94 are affixed to these holders.

When the push rod raises the racks 70, 71, the cutters will be moved toward the position shown at 94A in dotted lines in Fig. 4 and will cut a bevel like that shown in Fig. 8 and that shown on the section line at 8—8 in Fig. 2. When the racks are lowered, the cutters will be moved toward the position shown at 94B in Fig. 4 and will cut a bevel like that shown in Fig. 9 and that shown on the section line at 9—9 in Fig. 2.

The cutters need not have straight edges. They may have any desired form such, for example, as that shown at 94C in Fig. 11.

This mechanism is capable of adjusting the cutters to great nicety. For example, in the particular device from which the drawings herein were made, a movement of .039 of an inch of the push rod is required to move the cutters one degree.

Various modifications in construction, mode of operation, method and use of an invention may and do occur to others, especially after benefitting from knowledge of such disclosures as that herein presented of the principles involved, but the invention itself is not confined to the present showing.

I claim:

1. In combination, a support, a head movable with respect to said support, a rotary body supported in said head for rotation on a given axis, a cutter holder, means rotatively supporting said cutter holder, on said body, for rotation on an axis at an angle to said given axis, a cutter affixed to the holder, an elongated stationary cam affixed to said support extending in the direction of the movement of said head, a cam follower mounted on said body in engagement with the cam and movable with respect to the said body in accordance with the contour of the cam, and means between the cutter holder and the cam follower for rotating the cutter holder with respect to the body in accordance with the movement of the cam follower to change the cutting angle of the cutter in accordance with the cam contour.

2. In combination, a support, a head movable with respect to said support, a rotary body supported in said head for rotation on a given axis, a cutter holder, means rotatively supporting said cutter holder on said body, for rotation on an axis at an angle to said given axis, a cutter affixed to the holder, an elongated stationary cam affixed to said support extending in the direction of the movement of said head, a cam follower comprising a vertically movable push rod mounted on said body in engagement with the cam and movable with respect to the said body in accordance with the contour of the cam, and means between the cutter holder and the cam follower for rotating the cutter holder with respect to the body in accordance with the movement of the cam follower to change the cutting angle of the cutter in accordance with the cam contour.

3. In combination, a longitudinally movable support, means mounting a work piece on said support, a head movable transversely with respect to the longitudinal movement of said support, pattern control means for determining the transverse movement of said head, a rotary body supported in said head for rotation on a given axis, a cutter holder, means rotatively supporting said cutter holder on said body, for rotation on an axis at an angle to said given axis, a cutter affixed to the holder, an elongated stationary cam affixed to said support extending in the direction of the movement of said head, a cam follower comprising a vertically movable push rod mounted on said body in engagement with the cam and movable with respect to the said body in accordance with the contour of the cam, and means between the cutter holder and the cam follower for rotating the cutter holder with respect to the body in accordance with the movement of the cam follower to change the cutting angle of the cutter in accordance with the cam contour.

References Cited in the file of this patent

UNITED STATES PATENTS

| | | |
|---|---|---|
| 1,442,804 | Hicks | Jan. 23, 1923 |
| 1,867,289 | Ventresca | July 12, 1932 |
| 1,966,618 | Egorenkov | July 17, 1934 |